US012759796B2

(12) United States Patent
Lindley et al.

(10) Patent No.: US 12,759,796 B2
(45) Date of Patent: Oct. 13, 2026

(54) METHOD FOR TRANSFERRING ARTICLES FROM A LONG-TERM STORE TO A SHORT-TERM BUFFER, AND STORAGE AND ORDER-PICKING SYSTEM THEREFOR

(71) Applicant: TGW Logistics GmbH, Marchtrenk (AT)

(72) Inventors: Timothy Lindley, Schwerte (DE); Gerald Kettlgruber, Linz (AT)

(73) Assignee: TGW Logistics GmbH, Marchtrenk (AT)

( * ) Notice: Subject to any disclaimer, the term of this patent is extended or adjusted under 35 U.S.C. 154(b) by 347 days.

(21) Appl. No.: 18/575,374

(22) PCT Filed: Jun. 28, 2022

(86) PCT No.: PCT/AT2022/060223
§ 371 (c)(1),
(2) Date: Dec. 29, 2023

(87) PCT Pub. No.: WO2023/272321
PCT Pub. Date: Jan. 5, 2023

(65) Prior Publication Data

US 2024/0308771 A1 Sep. 19, 2024

(30) Foreign Application Priority Data

Jun. 30, 2021 (AT) .............................. A 50541/2021

(51) Int. Cl.
*B65G 1/137* (2006.01)
*B65G 1/04* (2006.01)

(52) U.S. Cl.
CPC ......... *B65G 1/1378* (2013.01); *B65G 1/0464* (2013.01)

(58) Field of Classification Search
CPC ... B65G 1/0464; B65G 1/1373; B65G 1/1378
See application file for complete search history.

(56) References Cited

U.S. PATENT DOCUMENTS 5,664,928 A * 9/1997 Stauber ................ B65G 1/1378 414/281
9,014,843 B2 4/2015 Winkler
(Continued)

FOREIGN PATENT DOCUMENTS

DE 10 2011 104 511 B3 10/2012
DE 10 2013 101 659 A1 8/2013
(Continued)

OTHER PUBLICATIONS

International Search Report in PCT/AT2022/060223, mailed Sep. 27, 2022.
(Continued)

*Primary Examiner* — Joseph C Rodriguez
(74) *Attorney, Agent, or Firm* — Collard & Roe, P.C.

(57) ABSTRACT

A method for transferring articles from a long-term store to a short-term buffer in a storage and picking system which includes the long-term store, the automatically operated short-term buffer and a transfer system between the long-term store and the short-term buffer, acquires, by an order-processing computer, multiple orders, defines an analysis quantity with multiple orders, sorts order lines of the analysis quantity and forms article groups, each with articles of one article type. The articles of the article groups are then transferred from the long-term store to the short-term buffer. A storage and picking system carries out the method.

17 Claims, 7 Drawing Sheets

(56) References Cited

U.S. PATENT DOCUMENTS

| | | | | |
|---|---|---|---|---|
| 9,205,982 | B2 | 12/2015 | Winkler | |
| 9,760,086 | B2 * | 9/2017 | Woodtli | B65G 1/0492 |
| 10,354,221 | B2 | 7/2019 | Winkler | |
| 12,129,114 | B2 * | 10/2024 | Kettlgruber | B65G 1/0457 |
| 2015/0307278 | A1 * | 10/2015 | Wickham | G06Q 10/087 700/216 |
| 2016/0194153 | A1 * | 7/2016 | Issing | G06Q 10/087 700/216 |
| 2016/0347546 | A1 * | 12/2016 | Shakes | B65G 1/1373 |
| 2017/0185959 | A1 * | 6/2017 | Meurer | G06Q 10/0875 |
| 2017/0278055 | A1 * | 9/2017 | Winkler | G06Q 10/08 |
| 2018/0137459 | A1 | 5/2018 | Jacobs et al. | |
| 2018/0244473 | A1 * | 8/2018 | Mathi | B65G 47/905 |
| 2022/0017302 | A1 * | 1/2022 | Ahammer | B65G 1/0485 |
| 2022/0332508 | A1 * | 10/2022 | Winkler | B65G 1/065 |
| 2022/0374836 | A1 * | 11/2022 | Miyamoto | G06Q 10/0875 |
| 2023/0133964 | A1 * | 5/2023 | Gravelle | B65G 47/905 700/216 |

FOREIGN PATENT DOCUMENTS

| | | | |
|---|---|---|---|
| DE | 10 2014 115 579 | A1 | 4/2016 |
| WO | 2014/170433 | A1 | 10/2014 |

OTHER PUBLICATIONS

Andrae, Peter Richard, “Optimization of the order distribution of an automated warehouse system: Concept development and initial implementation based on a practical case study”, Master thesis, Sep. 17, 2012, total of 116 pages.

Logivations Consulting & Technology, Optimized Transport Orders and Order Sequence Oct. 2020.

Computer_Wikipedia; URL: http://pamt.at/c5d1, Aug. 25, 2022, total of 9 pages.

Sap, Ultimate Guide to Configure Warehouse Order Creation Rule in EWM, May 5, 2021, Internet <URL: http://pamt.at/uozm>, total of 12 pages.

* cited by examiner

AZ

M

| AT | ZL | WT | N |
|---|---|---|---|
| ... | ... | ... | ... |
| 1001 | 1 | A | 40 |
| 1001 | 2 | C | 50 |
| 1002 | 1 | D | 30 |
| 1002 | 2 | C | 70 |
| 1003 | 1 | A | 50 |
| 1003 | 2 | B | 130 |
| ... | | ... | ... |

Fig. 2

| AT | ZL | WT | N |
|---|---|---|---|
| 1003 | 1 | A | 50 |
| 1003 | 2 | B | 130 |
| 1002 | 1 | D | 30 |
| 1002 | 2 | C | 70 |
| 1001 | 1 | A | 40 |
| 1001 | 2 | C | 50 |

Fig. 3

| AT | ZL | WT | N |
|---|---|---|---|
| 1003 | 2 | B | 130 |
| 1003 | 1 | A | 50 |
| 1002 | 2 | C | 70 |
| 1002 | 1 | D | 30 |
| 1001 | 2 | C | 50 |
| 1001 | 1 | A | 40 |

Fig. 4

| WT | N | |
|---|---|---|
| B | 130 | WG |
| A | 90 | |
| C | 120 | |
| D | 30 | |

Fig. 5

| AT | P | WT | N |
|---|---|---|---|
| ... | ... | ... | ... |
| 1001 | L | A | 40 |
| 1001 | L | C | 50 |
| 1002 | H | D | 30 |
| 1002 | H | C | 70 |
| 1003 | L | A | 50 |
| 1003 | L | B | 130 |
| ... | | ... | ... |

M

Fig. 6

| AT | P | WT | N |
|---|---|---|---|
| 1002 | H | D | 30 |
| 1002 | H | C | 70 |
| 1001 | L | A | 40 |
| 1001 | L | C | 50 |
| 1003 | L | A | 50 |
| 1003 | L | B | 130 |

Fig. 7

| AT | P | WT | N |
|---|---|---|---|
| 1002 | H | D | 30 |
| 1002 | H | C | 70 |
| 1003 | L | A | 50 |
| 1003 | L | B | 130 |
| 1001 | L | A | 40 |
| 1001 | L | C | 50 |

Fig. 8

| AT | P | WT | N |
|---|---|---|---|
| 1002 | H | C | 70 |
| 1002 | H | D | 30 |
| 1003 | L | B | 130 |
| 1003 | L | A | 50 |
| 1001 | L | C | 50 |
| 1001 | L | A | 40 |

Fig. 9

| WT | N |
|---|---|
| C | 120 |
| D | 30 |
| B | 130 |
| A | 90 |

WG

Fig. 10

| AT | ZL | WT | N |
|---|---|---|---|
| 1003 | 2 | B | 130 |
| 1002 | 2 | C | 70 |
| 1001 | 2 | C | 50 |
| 1003 | 1 | A | 50 |
| 1001 | 1 | A | 40 |
| 1002 | 1 | D | 30 |

Fig. 11

| WT | N | |
|---|---|---|
| B | 130 | WG |
| C | 120 | |
| A | 90 | |
| D | 30 | |

Fig. 12

METHOD FOR TRANSFERRING ARTICLES FROM A LONG-TERM STORE TO A SHORT-TERM BUFFER, AND STORAGE AND ORDER-PICKING SYSTEM THEREFOR

CROSS REFERENCE TO RELATED APPLICATIONS

This application is the National Stage of PCT/AT2022/060223 filed on Jun. 28, 2022, which claims priority under 35 U.S.C. § 119 of Austrian Application No. A50541/2021 filed on Jun. 30, 2021, the disclosure of which is incorporated by reference. The international application under PCT article 21(2) was not published in English.

BACKGROUND OF THE INVENTION

1. Field of the Invention

The invention relates to a method for transferring articles from a long-term store to a short-term buffer in a storage and picking system which comprises the long-term store, the automatically operated short-term buffer and a transfer system between the long-term store and the short-term buffer. Furthermore, the invention relates to a storage and picking system for performing said method, the storage and picking system comprising a long-term store for providing the articles, a short-term buffer for buffering articles, a transfer system for retrieving the articles from the long-term store and transferring the articles from the long-term store to the short-term buffer, as well as an order-processing computer.

2. Description of the Related Art

A method and a storage and picking system of the mentioned type are generally known from the prior art. For example, DE 10 2011 104 511 B3 discloses a method for order-oriented compilation of various articles from a long-term store in accordance with a large number of orders, in which an analysis quantity is defined, and in which stocked articles are quasi-continuously transferred from a long-term store to a short-term store in an article-specific manner. Any article type contained in the analysis quantity is selected, a total requirement for the selected article type is determined and this total requirement for the selected article type is transferred from long-term store to short-term store. These steps are repeated for another article type that is contained in the analysis quantity and that has not yet been selected until every article type contained in the analysis quantity has been selected, analyzed and transferred.

A disadvantage of the known method is that it can lead to an overload of the short-term store under certain circumstances, namely when articles for large orders are almost completely in stock in the short-term store, but a few articles are permanently missing. This can happen if articles for smaller orders are removed from the short-term store in order to pick them, but these small quantities of articles are then missing for the completion of a large order. As a result, a large quantity of articles remains permanently in the short-term store, which is normally rather small, but is configured to be particularly efficient, whereby the short-term store is overloaded in the worst case, but its efficiency suffers in any case.

SUMMARY OF THE INVENTION

One object of the invention is therefore to provide an improved method for transferring articles from a long-term store to a short-term buffer and an improved storage and picking system for performing the method. In particular, a high performance of the short-term buffer is to be maintained and overloading of the same is to be avoided.

The object of the invention is achieved by a method of the initially mentioned type, which has the following steps:

i) providing the articles in the long-term store, ii) acquiring a plurality of orders, each with at least one order line, wherein each order line specifies an article type and a number of the articles of this article type comprised by the order, by an order-processing computer, iii) defining an analysis quantity comprising any number of orders by the order-processing computer, iv) sorting the order lines of the analysis quantity according to a first sorting criterion in a list by the order-processing computer, v) selecting an order line sorted in the list which has not yet been selected and, if present, selecting at least one further order line of the orders of the analysis quantity which contains the same article type as the selected order line by the order-processing computer, vi) combining the order lines selected in step v) from different orders to form an article group, wherein the article group comprises only articles of one (single) article type in each case, by the order-processing computer, vii) repeating steps v) and vi) until all order lines have been selected and assigned to an article group, viii) retrieving the articles of the article groups from the long-term store and transferring the articles of the article groups from the long-term store to the short-term buffer by the transfer system until all articles of each article type contained in the analysis quantity have been transferred from the long-term store to the short-term buffer.

The object of the invention is also achieved by a storage and picking system of the initially mentioned type, wherein the order-processing computer is configured a) to acquire the orders, each with at least one order line in each case, wherein each order line specifies an article type and a number of the articles of this article type comprised by the order, b) to define an analysis quantity comprising any number of orders, c) to sort order lines of the analysis quantity in a list according to a first sorting criterion, d) to select an order line sorted in the list which has not yet been selected and, if available, to select at least one further order line of the orders of the analysis quantity which contains the same article type as the selected order line, e) to combine the order lines of different orders selected in accordance with point d) into article groups, wherein each article group only contains articles of one article type, and f) to repeat points d) and e) until all order lines have been selected and assigned to an article group, wherein the transfer system is configured to carry out the removal of the articles from the long-term store and the transfer of the articles from the long-term store to the short-term buffer until all articles of each article type contained in the analysis quantity have been transferred from the long-term store to the short-term buffer.

The proposed measures ensure that the transfer of articles from the long-term store to the short-term buffer takes place in an orderly and sensible manner. Before articles are retrieved from long-term store and transferred to the short-term buffer, the order lines of the analysis quantity are sorted in a list according to an initial sorting criterion for this purpose. This prevents random and unfortunate selection of article types from limiting the performance of the short-term buffer or overloading it.

For example, the number of the articles included in an order can be provided as the first sorting criterion, wherein the order lines are sorted in step iv) starting with the largest number of articles in an order. In other words, the order lines are sorted in step iv) from the largest number of articles in an order to the smallest number of articles in an order. As a result, the articles in large orders are preferably retrieved from store, whereas smaller orders are sorted behind. This drastically reduces the likelihood of articles from smaller orders being removed from the short-term store that are missing for the completion of a large order. Large orders can also be processed quickly, which means that the short-term store is constantly emptied on a big scale and its capacity is maintained. Conversely, a short-term store can be made even smaller with the same capacity, thus reducing the space required for a storage and picking system and the resources used for this. Preferably, the order lines of an order are sorted together so that a sequence of the order lines within the order is not changed.

Alternatively, it is also advantageous if a priority of the orders is provided as the first sorting criterion and the order lines are sorted in sequence from high priority to low priority in step iv). As a result, the articles of high-priority orders are preferably retrieved from the store, whereas orders with a lower priority are sorted behind. Here again, it is preferably provided that the order lines of an order are sorted together so that a sequence of the order lines within the order is not changed.

In a further advantageous embodiment variant, the number of the articles of an article type contained in the analysis quantity is provided as the first sorting criterion, wherein the order lines are sorted in step iv) starting with the largest number of articles of an article type. This embodiment variant can also drastically reduce the likelihood of articles from smaller orders being removed from the short-term store that are missing for the completion of a large order. Here too, the short-term store is constantly emptied on a big scale and its capacity is maintained. Conversely, here as well, a short-term store can be made even smaller with the same capacity, thus reducing the space required for a storage and picking system and the resources used for this. Preferably, the order lines of an order are again sorted together so that a sequence of the order lines within the order is not changed.

In another advantageous embodiment variant, the first sorting criterion is the number of the articles in the order line. As a result, the articles in large order lines are preferably retrieved from store, whereas order lines with a small number of articles are sorted behind.

The articles in the article groups formed using the method described above can be retrieved from the long-term store manually or using a retrieval conveyor system. In the case of manual retrieval, a person retrieves the articles from the long-term store and takes them to the transfer station. In the case of automatic retrieval, the articles are retrieved and transported to the transfer station with the aid of a retrieval conveyor system. Articles in an article group are retrieved manually or automatically and/or transported manually or automatically to the transfer station.

For the automatic storage and/or retrieval of articles, the long-term store of the storage and picking system can preferably have a large number of fixed storage racks and at least one automatically operated storage and retrieval unit for storing the articles in the storage racks and/or retrieving the articles from the storage racks. The storage racks can be configured for suspended and/or horizontal provision of articles.

Preferably, the transfer system of the storage and picking system also comprises a transfer station, a first conveying system connecting the long-term store and the transfer station and a second conveying system connecting the transfer station and the short-term buffer. At the transfer station, articles can be transferred from a first loading aid, for example from a container, to a second loading aid, for example into a hanging bag.

A transfer station for manually transferring the articles between the first and second loading aids can comprise an input and output device. According to this embodiment, the transfer can be carried out by a warehouse worker who receives instructions for transferring the articles at the output device and can acknowledge (confirm) the completed transfer process at the input device.

A transfer station for automatically transferring the articles between the first and second loading aids may comprise a transfer robot and a control unit. According to this embodiment, the transfer can be carried out by the transfer robot, which receives an instruction from the control unit to transfer the articles.

The (first and/or second) loading aids can be formed as containers, trays, pallets, transport carriers for suspended transport of articles, hanging bags, clothes hooks or the like.

The first conveying system can, for example, be formed as a stationary (floor-bound) conveying system, in particular as a roller conveyor system or belt conveyor system. Alternatively, the first conveying system can be formed as a mobile conveying system, for example comprising "automated guided vehicles" (AGV in short) or "autonomous mobile robots" (AMR in short).

The second conveying system is preferably formed as an overhead conveying system. In this case, the articles can be transported on the overhead conveying system by a transport carrier (e.g. with a clothes hook) and in particular also in a hanging bag. Preferably, precisely one article is transported with a transport carrier or in the hanging bag. However, it is also possible for more than one article to be transported simultaneously with a transport carrier or with the hanging bag. If multiple articles are transported simultaneously with a transport carrier or a hanging bag, they are predominantly articles of the same article type.

According to an alternative embodiment, the first conveying system can also be formed as an overhead conveying system. In this case, the overhead conveying system can be formed as described in connection with the second conveying system.

For example, if the first conveying system and the second conveying system are each formed as an overhead conveying system, the transfer of articles from the first loading aid to the second loading aid at the transfer station can take place by transferring the articles from a first transport carrier to a second transport carrier.

Preferably, the short-term buffer of the storage and picking system also comprises an overhead conveying system for suspended transport of the articles by transport carriers or hanging bags. This means that the same conveyor technology can be used for the second conveying system and the short-term buffer.

Usually, exactly one article group is formed for each article type; in principle, there could also be multiple article groups of the same article type.

The retrieval and transfer of the articles in step viii) can take place after step vii), wherein in step vii) a large number of article groups are created, the articles of which are then retrieved. Alternatively, the retrieval of the articles in step viii) can also take place during step vii), wherein the articles of one or multiple article groups are retrieved and transferred before all order lines have been selected and assigned to an article group. For example, the articles of an article group can be retrieved and transferred as soon as the corresponding article group has been created. Specifically, this means that an article group can be retrieved from the long-term store and transferred to the short-term buffer as soon as the article group has been created for the relevant article type, regardless of whether subsequent article groups have been created for other article types and regardless of whether their creation has even begun.

In addition, the retrieval and transfer of articles can take place simultaneously or overlapping in time for different article groups. For example, articles from one article group of one article type can already be transferred to the short-term buffer, while articles from other article groups are only retrieved from the long-term store. The articles of different article groups could also be transferred to the short-term buffer simultaneously or overlapping in time, for example if multiple parallel conveyor routes lead from the long-term store to the short-term buffer.

In the context of the invention, a "long-term store" is primarily used for the longer-term storage of articles that are only assigned to an order towards the end of their storage time. Although the articles can remain in the long-term store for a short time from the time they are assigned to an order until they are transferred to the short-term buffer, this period of time is short compared to the total storage time. In particular, the period of time from the time they are assigned to an order until they are transferred to the short-term buffer can be less than 10% of the total storage time. To a lesser extent, however, articles that have not yet been ordered can also be transferred from the long-term store to the short-term buffer if an order for these articles is considered likely in the immediate future. In particular, the proportion of articles transferred to the short-term buffer but not yet ordered can be less than 50%, in particular less than 10% of all articles transferred from the long-term store to the short-term buffer. In terms of order of magnitude, the period of time over which the articles are stored in the long-term store ranges from a few days to weeks and months.

In the context of the invention, a "short-term buffer" is primarily used for the short-term buffering or holding of articles that have already been ordered and for which the delivery process has been initiated. To a small extent, however, articles that have not yet been ordered can also be placed in the short-term buffer if an order for these articles is considered likely in the immediate future. In particular, the proportion of articles that have already been ordered and transferred from the long-term store to the short-term buffer can be more than 90% of all articles transferred from the long-term store to the short-term buffer. In particular, the proportion of articles that have not yet been ordered and have been transferred from the long-term store to the short-term buffer can be less than 10% of all articles transferred from the long-term store to the short-term buffer. In terms of order of magnitude, the period of time over which the articles remain in the short-term buffer ranges from a few minutes to a few hours.

The short-term buffer fulfills the following functions in particular:

- buffering the articles of multiple article groups and multiple orders,
- sorting the articles,
- providing the articles according to the orders, and
- storing returned articles.

In particular, the method may also include the following steps:

- buffering the articles in the short-term buffer,
- transporting the articles intended for an order from the article groups mentioned to the picking station, and
- ready-for-dispatch provision of the articles intended for an order at the picking station.

The "ready-for-dispatch provision" can include, in particular, the loading of the articles belonging to an order into/onto one or more shipping loading aids. This step can be carried out automatically, manually or semi-automatically.

For said purpose, the storage and picking system advantageously comprises a picking station and a third conveying system connecting the short-term buffer to the picking station, wherein the picking station is configured for loading the articles into target containers in accordance with the orders.

If some or all of the articles for an order are available in the short-term buffer, the picking operation can be started and the articles in question can be transported to the picking station. In particular, the picking operation can be started when all the articles for an order are available in the short-term buffer. The transportation of these articles to the picking station and the picking operation itself can take place simultaneously with and also independently of step viii) for articles that are not yet present in the short-term buffer. This means that the picking operation of articles can take place simultaneously with and also independently of the retrieval of other articles from the long-term store and transfer of these other articles to the short-term buffer.

The third conveying system is preferably formed as an overhead conveying system. In this case, the articles can be transported on the overhead conveying system by a transport carrier and in particular also in a hanging bag. Preferably, precisely one article is transported with a transport carrier or in the hanging bag. However, it is also possible for more than one article to be transported simultaneously with a transport carrier or with the hanging bag. If multiple articles are transported simultaneously with a transport carrier or a hanging bag, they are predominantly articles of the same article type.

Further advantageous designs and advancements of the invention result from the description in combination with the figures.

It is advantageous if the sorting in step iv) additionally comprises sorting the order lines of the analysis quantity according to a second sorting criterion. This allows the article groups to be ranked even better for the given purpose. The second sorting criterion can be selected from the examples given above for the first sorting criteria. The second sorting criterion is, however, ranked behind a selected first sorting criterion and is different from it. For example, the number of articles per order, i.e. the order size, can be provided as the second sorting criterion. A prioritization of the orders is preferably selected as the first sorting criterion. In this case, the order lines of an order can be sorted together, in particular without changing their sequence within the order. Alternatively, a priority of the orders can be provided as the second sorting criterion, in particular if the first sorting criterion is the order size.

Alternatively, the second sorting criterion can also be the number of the articles in an order line, for example if the first sorting criterion is the order size.

It is also advantageous if the sorting in step iv) additionally comprises sorting the order lines of the orders of the analysis quantity according to at least a third sorting criterion. This allows the article groups to be ranked even better for the given purpose. The third sorting criterion can again be selected from the examples given above for the first sorting criteria. The third sorting criterion is, however, ranked behind a selected second sorting criterion and is different from it (thus the third sorting criterion is also ranked behind a selected first sorting criterion and is different from it). Preferably, the number of the articles in the order lines can be provided for the third sorting criterion, for example if the order size was selected as the second sorting criterion and, optionally, the priority was selected as the first sorting criterion. In this regard, it is particularly preferred that the order lines of the orders are sorted according to the number of the articles without changing a previously sorted order of the orders. It is also possible for the number of the articles in the order lines to be provided as the third sorting criterion if the priority was selected as the second sorting criterion and, optionally, the order size was selected as the first sorting criterion.

Steps v) are preferably carried out in sequence from the first to the last order line in the list. This means, for example, that large orders are preferred if an order size is selected as the first sorting criterion. However, it is also possible to reverse the sequence. In this case, for example, small orders are preferred if an order size is selected as the first sorting criterion. For example, this allows a large number of orders to be processed quickly.

Alternatively, it is also advantageous if steps v) are carried out alternately with the first and last remaining order line in the list, in particular starting with the first order line in the list. In this way, a transfer of articles from the long-term store to the short-term buffer can be realized, which is uniform with regard to the selected sorting criterion. For example, if an order size is selected as the first sorting criterion, articles of large and small orders are transferred alternately from the long-term store to the short-term buffer. This results in a uniform transfer of articles with regard to the order size. Thereby, unbalanced loads in the short-term buffer can be avoided. In relation to the selected example, this means that the short-term buffer contains neither an excessive number of articles of large orders nor an excessive number of articles of small orders.

It is also advantageous if an article group is extended by a predeterminable number of articles that are not contained in the analysis quantity. These are, for example, articles that are assigned to an order, but this order is not part of the analysis quantity, or articles that are not yet assigned to any order at all. One particular advantage of this is that preventive replenishment and/or a forward-looking transfer of articles from the long-term store to the short-term buffer can take place, for example for orders that have not yet been processed as part of an analysis quantity or future orders (not yet acquired). If the order-processing computer acquires an order that exclusively comprises articles that are already preventively stored in the short-term buffer, this can also be completed without the aforementioned steps. This means that no analysis quantity needs to be defined and no separate article groups need to be created. Alternatively, orders can include articles that are already preventively in stock in the short-term buffer as well as articles that are not yet in stock in the short-term buffer. In this case, the aforementioned steps can be carried out for those articles that are not yet in stock in the short-term buffer. For those articles which are already in stock in the short-term buffer, the aforementioned steps can be omitted for the completion of the order.

In a further alternative embodiment variant, an article group can be extended to include articles that are not contained in the analysis quantity if a loading aid retrieved from the long-term store can thereby be completely emptied during the transfer of the articles. In this way, it can be avoided that a possibly small residual quantity of articles is returned to the long-term store. Instead, these articles are also transferred to the short-term buffer preventively and/or in advance in this variant. Orders that only include articles that are already preventively stored in the short-term buffer can in turn be completed without the aforementioned steps. Mixed orders can again be handled as described above.

BRIEF DESCRIPTION OF THE DRAWINGS

For the purpose of better understanding of the invention, it will be elucidated in more detail by the figures below.

These show in a respectively very simplified schematic representation:

FIG. 2 a table with a first exemplary analysis quantity;

FIG. 3 the table from FIG. 2 after sorting according to order size;

FIG. 4 the table from FIG. 3 after sorting according to number of articles of an order line;

FIG. 5 the article groups formed from the table according to FIG. 4;

FIG. 6 a table with a second exemplary analysis quantity;

FIG. 7 the table from FIG. 6 after sorting according to order priority;

FIG. 8 the table from FIG. 7 after sorting according to order size;

FIG. 9 the table from FIG. 8 after sorting according to number of articles of an order line;

FIG. 10 the article groups formed from the table according to FIG. 9;

FIG. 11 the table from FIG. 2 after sorting according to circumference of article types; and FIG. 12 the article groups formed from the table according to FIG. 11.

DETAILED DESCRIPTION OF THE PREFERRED EMBODIMENTS

Figure 1:
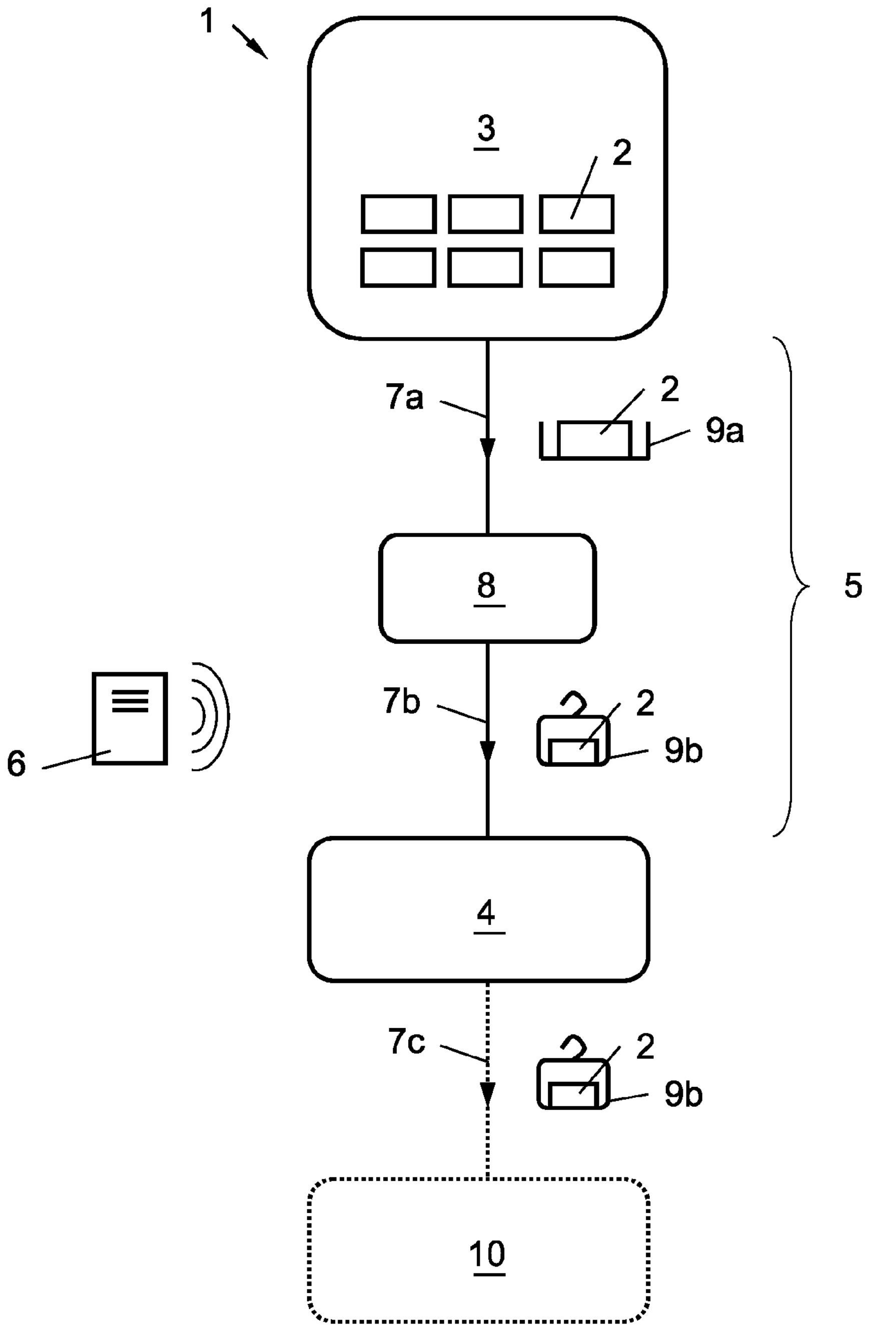
FIG. 1 a schematic representation of an exemplary storage and picking system.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIG. 1 shows a schematically illustrated storage and picking system 1, which comprises a long-term store 3 for providing articles 2, a short-term buffer 4 for buffering the articles 2 and a transfer system 5 for retrieving the articles 2 from the long-term store 3 and for transferring the articles 2 from the long-term store 3 to the short-term buffer 4. In addition, an order-processing computer 6 is also shown in FIG. 1. In the example shown in FIG. 1, the order-processing computer is configured for communication via a radio link for the sake of simplicity; it can, of course, alternatively or additionally also be set up for wired communication.

In the example shown, the transfer system 5 comprises a transfer station 8, a first conveying system 7*a* connecting the long-term store 3 and the transfer station 8, and a second conveying system 7*b* connecting the transfer station 8 and the short-term buffer 4.

For example, the long-term store 3 may have a plurality of stationary storage racks and at least one automatically operated storage and retrieval device for storing the articles 2 in the storage racks and/or retrieving the articles 2 from the storage racks. Possible designs of storage racks and storage and retrieval devices are known per se and are therefore not shown in detail in FIG. 1.

The first conveying system 7*a* can, for example, be formed as a stationary (floor-bound) conveying system, in particular as a roller conveyor system or belt conveyor system. Alternatively, the first conveying system 7*a* can be formed as a mobile conveying system, for example comprising "automated guided vehicles" (AGV in short) or "autonomous mobile robots" (AMR in short). Alternatively, the first conveying system 7*a* can also be formed as an overhead conveying system.

In the example shown in FIG. 1, the articles 2 are transported with the aid of first loading aids 9*a*, which are formed here as containers open at the top. However, it would also be conceivable for the articles 2 to be transported with the aid of other first loading aids 9*a*, for example on trays, pallets, transport carriers, clothes hooks, etc., or even without first loading aids 9*a*.

The second conveying system 7*b* is preferably formed as an overhead conveying system. In this case, the articles 2 can be transported on the overhead conveying system by a transport carrier and in particular also with a second loading aid 9*b*, which is formed as a hanging bag, as shown symbolically in FIG. 1. Preferably, exactly one article 2 is transported with a transport carrier or the hanging bag 9*b*. However, it is also possible that more than one article 2 is transported simultaneously with a transport carrier or the hanging bag 9*b*. If multiple articles 2 are transported simultaneously with one transport carrier or hanging bag 9*b*, they are predominantly articles 2 of the same article type.

Like the second conveying system 7*b*, the short-term buffer 4 can also comprise an overhead conveying system for suspended transport of the articles 2 by a transport carrier or by hanging bags 9*b*.

In the example shown in FIG. 1, the storage and picking system 1 also has an optional picking station 10 and a third conveying system 7*c* connecting the short-term buffer 4 to the picking station 10. At the picking station 10, the articles 2 can be loaded into target containers according to orders.

The third conveying system 7*c* can again preferably be formed as an overhead conveying system. In this case, the articles 2 can be transported on the overhead conveying system by a transport carrier or also with a second loading aid 9*b*, which is formed as a hanging bag, as shown symbolically in FIG. 1. Preferably, exactly one article 2 is transported with a transport carrier or the hanging bag 9*b*. However, it is also possible here that more than one article 2 is transported simultaneously with a transport carrier or a hanging bag 9*b*. If multiple articles 2 are transported simultaneously with one transport carrier or hanging bag 9*b*, they are predominantly articles 2 of the same article type.

The function of the storage and picking system 1 shown in FIG. 1 is now explained in more detail with reference to FIGS. 2 to 12, which relate to different embodiments. Specifically, the following exemplary embodiments are explained in more detail with the aid of FIGS. 2 to 12;

FIG. 2-5: Sorting orders AT according to order size, wherein the order lines AZ are sorted according to the number N of articles 2 within the orders AT.

FIG. 6-10: Sorting orders AT according to a priority P, wherein within a group of the same priority P the orders AT are sorted according to order size and within the orders AT the order lines AZ are sorted according to the number N of articles 2.

FIG. 11-12: Sorting according to the number N of articles 2 of an article type WT contained in the analysis quantity M, wherein within an article group WG of the same article type WT, the order lines AZ are sorted according to the number N of articles 2.

In general, the disclosed method for transferring articles 2 from the long-term store 3 to the short-term buffer 4 comprises the following steps:

In a step i), the articles 2 are provided in the long-term store 3, for example by placing the articles 2 on storage racks of the long-term store 3.

In a further step ii), multiple orders AT, each with at least one order line AZ, are acquired by the order-processing computer 6. Each order line AZ specifies an article type WT and a number N of articles 2 of this article type WT comprised by the order AT. FIG. 2 shows an exemplary table containing order lines AZ of multiple orders AT. In the columns of the table, order numbers of the orders AT, line numbers ZL of the order lines AZ of an order AT, article types WT of the articles 2 listed in the order lines AZ and the number N of articles 2 listed in the order lines AZ are listed.

In a further step iii), the order-processing computer 6 defines an analysis quantity M, which may comprise any number of orders AT. In the example shown in FIG. 2, the analysis quantity M comprises the orders AT=1001, 1002 and 1003. Each order AT comprises two order lines AZ with the line numbers ZL=1 and 2. However, each order AT can of course comprise any number of order lines AZ. The analysis quantity M also includes the article types WT=A, B, C and D. The fourth column contains the number N of articles 2 listed in the order lines AZ. It should be noted at this point that the scope of the analysis quantity M and the orders AT in FIG. 2 is chosen purely by way of example and that the method presented is equally applicable to other analysis quantities M and other orders AT.

In a step iv), the order lines AZ of the analysis quantity M are sorted in a list by the order-processing computer 6 according to a first sorting criterion. FIG. 3 shows an example in which the number N of articles 2 comprised by the order AT is provided as the first sorting criterion and the order lines AZ are sorted in step iv) starting with the largest number N of articles 2 of an order AT. FIG. 3 shows the result after this sorting step. The order AT=1003 has the largest volume with 180 articles 2. This is followed by order AT=1002 with 100 articles 2 and order AT=1001 with 90 articles 2.

In principle, the provision of a first sorting criterion is sufficient. In this example, however, sorting according to the number N of articles 2 is also performed within the orders AT. This means that the number N of articles 2 in an order line AZ is provided as a second sorting criterion. FIG. 4 shows the result of this sorting step. It can be seen from the table that the sequence of orders AT=1003, 1002, 1001 has not changed and only the order lines AZ within an order AT have been rearranged. The second sorting criterion is accordingly ranked behind the first sorting criterion.

In a step v), the order-processing computer 6 now selects an order line AZ sorted in the list which has not yet been selected. In addition, the order-processing computer 6 selects a further order line AZ of the orders AT of the analysis quantity M, which contains the same article type WT as the selected order line AZ, if such an order line is available.

In a step vi), the order lines AZ of various orders AT selected in step v) are combined by the order-processing computer 6 to form an article group WG, wherein the article group WG comprises only articles 2 of one article type WT in each case.

In a step vii), steps v) and vi) are repeated until all order lines AZ have been selected and assigned to an article group WG.

FIG. 5 shows the result of steps v) to vii), wherein steps v) are carried out in sequence from the first to the last order line AZ in the list.

In a first run of step v), the first order line AZ of the list is accordingly selected. It contains articles 2 of the article type WT=B. Since the article type WT=B is only contained in a single order line AZ, no further order line AZ can be selected. In steps v) and vi), the article group WG is accordingly formed for the article type WT=B, which is listed in the first line of the table in FIG. 5. The article group WG for the article type WT=B comprises a number N of 130 articles 2, which originate from the order AT=1003.

In a further run of step v), the next order line AZ in the list that has not yet been selected is chosen. In this specific case, this is the second order line AZ in the list. It contains articles 2 of the article type WT=A. Articles 2 of the article type WT=A are also contained in the last order line AZ of the list. Accordingly, this order line AZ of the list is also selected. The next article group WG for article type WT=A in FIG. 5 thus comprises a total of 90 articles 2, which originate from the orders AT=1003 and 1001.

In a further run of step v), the next order line AZ in the list that has not yet been selected is chosen. In this specific case, this is the third order line AZ in the list. It contains articles 2 of the article type WT=C. However, articles 2 of the article type WT=C are also contained in the penultimate order line AZ of the list. Accordingly, this order line AZ of the list is also selected. The next article group WG for article type WT=C in FIG. 5 thus comprises a total of 120 articles 2, which originate from the orders AT=1002 and 1001.

In a further run of step v), the next order line AZ in the list that has not yet been selected is chosen. In this specific case, this is the fourth order line AZ in the list. It contains articles 2 of the article type WT=D. As the article type WT=D is only contained in a single order line AZ and no other order line AZ exists in the analysis quantity M that has not yet been selected, no further order line AZ can be selected. The article group WG for the article type WT=D thus comprises a number N of 30 articles 2, which originate from the order AT=1002.

With the above run of step v), all order lines AZ of the list are selected, and no further order line AZ can be selected. Accordingly, all article groups WG, which are shown in FIG. 5 in the order to be processed, were also formed in step vi). Accordingly, step vii) is also completed.

In step viii), the articles 2 of the article groups WG are now retrieved from the long-term store 3 and transferred from the long-term store 3 to the short-term buffer 4 by the transfer system 5. This takes place in the sequence shown in FIG. 5 until all articles 2 of each article type WT contained in the analysis quantity M have been transferred from the long-term store 3 to the short-term buffer 4, i.e. as long as article groups WG that have not yet been transferred exist.

The retrieval and transfer of articles 2 in step viii) takes place after step vii) in the above example. This means that a plurality of article groups WG is created, the articles 2 of which are then retrieved. However, this is not the only conceivable option. It is also conceivable that the retrieval of the articles 2 in step viii) takes place alternatively during step vii). This means that the articles 2 of one or more article groups WG are retrieved and transferred before all order lines AZ have been selected and assigned to an article group WG. For example, the articles 2 of an article group WG can be retrieved and transferred as soon as the corresponding article group WG has been created.

Specifically, for the example shown in FIG. 5, this means that the article group WG for the article type WT=B can be retrieved from the long-term store 3 and transferred to the short-term buffer 4 as soon as the article group WG for the article type WT=B has been created, regardless of whether the subsequent article groups WG for the article types WT=A, C and D have been created and also regardless of whether their creation has even begun. Of course, the same principle can also be applied to the article groups WG for the article types WT=A and C. The article groups WG for the article types WT=D, on the other hand, do not have a subsequent article group WG.

In addition, it is also noted that the retrieval and transfer of articles 2 can take place simultaneously or overlapping in time for different article groups WG. For example, the articles 2 of article group WG of the article type WT=B can already be transferred to short-term buffer 4, while the articles 2 of article group WG of the article type WT=A are first retrieved from the long-term store 3. Articles 2 could also be transferred to the short-term buffer 4 simultaneously or overlapping in time, for example if multiple parallel conveyor routes lead from the long-term store 3 to the short-term buffer 4. For example, articles 2 of article group WG of the article type WT=B and articles 2 of article group WG of the article type WT=A could pass through the transfer system 5 simultaneously or overlapping in time.

Usually, exactly one article group WG is formed for each article type WT; however, in principle, there could also be multiple article groups WG of the same article type WT. For example, the article group WG of the article type WT=A in the example shown in FIG. 5 could be divided into multiple article groups WG, all of which concern article type WT=A, for example if the analysis quantity M has a particularly high number N of articles 2 of the article type WT=A.

In the example shown in FIG. 1, the articles 2 are transported using a conveying system 7*a* . . . 7*c*. However, the retrieval of the articles 2 from the long-term store 3 and the transportation of the articles 2 can also be carried out manually. In this case, a person retrieves the articles 2 from the long-term store 3 and takes them to the transfer station 8.

If some or all of the articles 2 for an order AT are available in the short-term buffer 4, the picking operation can be started and the articles 2 in question can be transported to the picking station 10 in an optional step. In particular, the picking operation can be started when all articles 2 of an order AT are present in the short-term buffer 4. However, it is also conceivable that the picking operation is already started when not all articles 2 of an order AT are yet present in the short-term buffer 4.

The transportation of these articles 2 to the picking station 10 and the picking operation itself can take place simultaneously with and also independently of step viii) for articles 2 that are not yet present in the short-term buffer 4. This means that the picking operation for articles 2 can take place simultaneously with and also independently of the retrieval of other articles 2 from the long-term store 3 and transfer of these other articles 2 to the short-term buffer 4.

For example, the order AT=1003 can be picked if the relevant number N of articles 2 of the article types WT=A and B are in stock in the short-term buffer 4, regardless of whether the articles 2 of the article group WG of the article types WT=C and D are in stock in the short-term buffer 4 and also regardless of whether they have already been retrieved from long-term store 3. Basically, the article group WG of the article types WT=C and D need not even have been formed in steps v) and vi) for picking the order AT=1003.

FIGS. 6-10 now illustrate a further embodiment example in which the orders AT are also assigned a priority P. In the output list shown in FIG. 6, the orders AT have either low priority P=L or high priority P=H. The table according to FIG. 6 has no column for the line numbers ZL. However, it is of course also conceivable that the table according to FIG. 6 is supplemented accordingly with line numbers ZL.

It is assumed that steps i) to iii) are carried out in the same way as in the previous example. Accordingly, the analysis quantity M again comprises the orders AT=1001, 1002 and 1003.

However, the first sorting criterion is now not the number N of articles 2 comprised by the order AT, but a priority P of the orders AT. Specifically, in step iv), the order lines AZ are sorted in sequence from high priority P=H to low priority P=L. FIG. 7 shows the result after this sorting step. The order AT=1002, which is assigned a high priority P=H, is in first place. It is followed by orders AT=1001 and 1003, which each only have a low priority P=L.

In principle, the provision of a first sorting criterion would also be sufficient in this example, but within a group with the same priority P, the orders AT are sorted according to order size. Thus, the order size is provided as the second sorting criterion. FIG. 8 shows the result after this sorting step. It can be seen from FIG. 8 that the order AT=1003 was ranked before order AT=1001, as order AT=1003, with a total number N of 180 articles 2, is larger than order AT=1001, which only has a number N of 90 articles 2. However, the order of the priority P was not changed. The second sorting criterion is accordingly ranked behind the first sorting criterion.

In this example, there is also an optional sorting of the order lines AZ according to the number N of articles 2 within the orders AT. This means that the number N of articles 2 is provided as a third sorting criterion. FIG. 9 shows the result after this sorting step. FIG. 9 also shows that the third sorting criterion is ranked behind the second sorting criterion.

Steps v) to vii) are again carried out in the same way as in the previous example. FIG. 10 shows the result of steps v) to vii), wherein steps v) are again carried out in sequence from the first to the last order line AZ of the list.

In the first run of step v), the first order line AZ of the list is selected. It contains articles 2 of the article type WT=C. However, articles 2 of the article type WT=C are also contained in the penultimate order line AZ of the list. Accordingly, this order line AZ of the list is also selected. The first article group WG for article type WT=C in FIG. 10 thus comprises a total of 120 articles 2, which originate from the orders AT=1002 and 1001.

In a further run of step v), the next order line AZ in the list that has not yet been selected is chosen. In this specific case, this is the second order line AZ in the list. It contains articles 2 of the article type WT=D. Since the article type WT=D is only contained in a single order line AZ, no further order line AZ is selected. The article group WG for the article type WT=D thus comprises a number N of 30 articles 2, which originate from the order AT=1002.

In a further run of step v), the next order line AZ in the list that has not yet been selected is chosen. In this specific case, this is the third order line AZ in the list. It contains articles 2 of the article type WT=B. Since the article type WT=B is only contained in a single order line AZ, no further order line AZ is selected. The article group WG for the article type WT=B comprises a number N of 130 articles 2, which originate from the order AT=1002.

In a further run of step v), the next order line AZ in the list that has not yet been selected is chosen. In this specific case, this is the fourth order line AZ in the list. It contains articles 2 of the article type WT=A. Articles 2 of the article type WT=A are also contained in the last order line AZ of the list. Accordingly, this order line AZ of the list is also selected. The number N of articles 2 in the article group WG for the article type WT=A thus comprises 90 articles 2, which originate from the orders AT=1003 and 1001.

With the above run of step v), all order lines AZ of the list are selected, and no further order line AZ can be selected. Accordingly, all article groups WG, which are shown in FIG. 10 in the order to be processed, were also formed in step vi). Accordingly, step vii) is also completed.

Step viii) is again carried out in the same way as in the previous example. This means that the articles 2 of the article groups WG are now retrieved from the long-term store 3 and transferred from the long-term store 3 to the short-term buffer 4 by the transfer system 5. This takes place in the sequence shown in FIG. 10 until all articles 2 of each article type WT contained in the analysis quantity M have been transferred from the long-term store 3 to the short-term buffer 4, i.e. as long as article groups WG that have not yet been transferred exist.

The embodiment variants listed for the first exemplary embodiment shown in FIGS. 2 to 5 can also be formed in the same way for the second embodiment example shown in FIGS. 6 to 10. This concerns in particular the modified sequence of steps vii) and viii), the simultaneous or temporally overlapping retrieval and transfer of the articles 2 of different article groups WG, the formation of multiple article groups WG of the same article type WT, the automatic or manual retrieval of the articles 2 and the automatic or manual transport of the articles 2, as well as the optional picking of articles 2, which may be independent of step viii).

FIGS. 11 and 12 show a further embodiment variant in which the state shown in FIG. 2 is assumed again. It is again assumed that steps i) to iii) are carried out in the same way as in the first example and as in the previous example. Accordingly, the analysis quantity M again comprises the orders AT=1001, 1002 and 1003.

However, the first sorting criterion is now the number N of articles 2 of an article type WT contained in the analysis quantity M, wherein the order lines AZ are sorted in step iv) starting with the largest number N of articles 2 of an article type WT. In principle, the provision of this first sorting criterion is also sufficient here, but within an article group WG of the same article type WT, a sorting of the order lines AZ according to the number N of articles 2 is performed. This means that the number N of articles 2 is provided as a second sorting criterion. FIG. 11 shows the result of these two sorting steps.

Steps v) to vii) are again carried out in the same way as in the first example and in the previous example. FIG. 12 shows the result of steps v) to vii), wherein steps v) are again carried out in sequence from the first to the last order line AZ of the list.

In a first run of step v), the first order line AZ of the list containing articles 2 of the article type WT=B is selected. The first article group WG for article type WT=B in FIG. 12 thus comprises a total of 130 articles 2, which originate from the order AT=1003.

In a further run of step v), the next order line AZ in the list that has not yet been selected is chosen. In this specific case, this is the second order line AZ in the list. It contains articles 2 of the article type WT=C, as does the third order line AZ of the list, which is therefore also selected. The second article group WG for article type WT=C in FIG. 12 accordingly comprises a total of 120 articles 2, which originate from the orders AT=1002 and 1001.

In a further run of step v), the next order line AZ in the list that has not yet been selected is chosen. In this specific case, this is the fourth order line AZ in the list. It contains articles 2 of the article type WT=A, as does the fifth order line AZ of the list, which is therefore also selected. The third article group WG for article type WT=A in FIG. 12 accordingly comprises a total of 90 articles 2, which originate from the orders AT=1003 and 1001.

In a last run of step v), the sixth line AZ of the list containing articles 2 of the article type WT=D is selected. The last article group WG for article type WT=D in FIG. 12 comprises a total of 30 articles 2, which originate from the order AT=1002.

With the above run of step v), all order lines AZ of the list are selected, and no further order line AZ can be selected. Accordingly, all article groups WG, which are shown in FIG. 12 in the order to be processed, were also formed in step vi). Accordingly, step vii) is also completed.

Step viii) is again carried out in the same way as in the previous example. This means that the articles 2 of the article groups WG are now retrieved from the long-term store 3 and transferred from the long-term store 3 to the short-term buffer 4 by the transfer system 5. This takes place in the sequence shown in FIG. 12 until all articles 2 of each article type WT contained in the analysis quantity M have been transferred from the long-term store 3 to the short-term buffer 4, i.e. as long as article groups WG that have not yet been transferred exist.

The embodiment variants listed for the first exemplary embodiment shown in FIGS. 2 to 5 can also be formed in the same way for the second embodiment example shown in FIGS. 11 to 12. This concerns in particular the modified sequence of steps vii) and viii), the simultaneous or temporally overlapping retrieval and transfer of the articles 2 of different article groups WG, the formation of multiple article groups WG of the same article type WT, the automatic or manual retrieval of the articles 2 and the automatic or manual transport of the articles 2, as well as the optional picking of articles 2, which may be independent of step viii).

In summary, it can be said that sorting of the order lines AZ of the analysis quantity M can be performed according to multiple different sorting criteria, each of which is ranked one behind the other. As illustrated by the examples, the sorting criteria can be the number N of articles 2 comprised by the order AT, a priority P of the orders AT, the number N of articles 2 of an article type WT contained in the analysis quantity M, as well as the number N of articles 2 contained in an order line AZ. The sorting criteria mentioned can each take on the role of the first, second or third (or even a further) sorting criterion.

In the examples shown, the order lines AZ are sorted in step iv)

starting with the largest number N of articles 2 of an order AT, sorted in sequence from high priority P=H to low priority P=L, or starting with the largest number N of articles 2 of an article type WT.

However, it would also be conceivable to reverse the sorting sequence, i.e.

starting with the smallest number N of articles 2 of an order AT, in sequence from low priority P=L to high priority P=H, or starting with the smallest number N of articles 2 of an article type WT.

In the examples shown, steps v) are carried out in sequence from the first to the last order line AZ of the list. However, this is not the only conceivable option. It is also conceivable that steps v) are carried out in sequence from the last to the first order line AZ of the list.

In addition, steps v) can also be performed alternately with the first and last remaining order line AZ in the list, in particular starting with the first order line AZ of the list. This variant is explained in more detail below for the exemplary embodiment according to FIGS. 11-12, but can also be applied in the same way to the embodiment examples according to FIGS. 2-5 and FIGS. 6-10.

In a first run of step v), the first order line AZ of the list containing articles 2 of the article type WT=B is again selected. This again results in the first article group WG shown in FIG. 12 for the article type WT=B.

In a further run of step v), not the next order line AZ in the list that has not yet been selected is selected, but the last remaining order line AZ in the list. This is the sixth order line AZ in the list, which contains articles 2 of the article type WT=D. The second line in the list shown in FIG. 12 is therefore not formed by the article group WG for the article type WT=C, but by the article group WG for the article type WT=D.

In a further run of step v), the first order line AZ of the list that has not yet been selected is selected. This is the second order line AZ of the list, which contains articles 2 of the article type WT=C, as well as the third order line AZ of the list, which is therefore also selected. The third line in the list shown in FIG. 12 is therefore not formed by the article group WG for the article type WT=A, but by the article group WG for the article type WT=C.

In a final run of step v), the last order line AZ of the list that has not yet been selected is selected. This is the fifth order line AZ of the list, which contains articles 2 of the article group WT=A, as well as the fourth order line AZ of the list, which is therefore also selected. The fourth line in the list shown in FIG. 12 is therefore not formed by the article group WG for the article type WT=D, but by the article group WG for the article type WT=A.

Thus, instead of the sequence B, C, A, D, the sequence B, D, C, A results for the article groups WG in the alternative embodiment example.

In the same way, the method presented can also begin with the last order line AZ of the list. This then results in the sequence D, B, A, C.

In all cases, step viii) is carried out in the same way as in the previous examples. This means that the articles 2 of the article groups WG are now retrieved from the long-term store 3 and transferred from the long-term store 3 to the short-term buffer 4 by the transfer system 5. This takes place in the indicated sequence until all articles 2 of each article type WT contained in the analysis quantity M have been transferred from the long-term store 3 to the short-term buffer 4, i.e. as long as article groups WG that have not yet been transferred exist.

In the examples disclosed above, it was always assumed that articles 2 retrieved from the long-term store 3 and transferred to the short-term buffer 4 always originate from the analysis quantity M. However, this is not a mandatory condition. Rather, it is also conceivable that an article group WG is extended by a predeterminable number N of articles 2 that are not contained in the analysis quantity M. For example, articles 2 that are not contained in the analysis quantity M can also be used for all or some article types WT, i.e. articles 2 that are assigned to an order AT but this order AT is not part of the analysis quantity M, or articles 2 that are not yet assigned to any order AT at all. One particular advantage of this is that preventive replenishment and/or a forward-looking transfer of articles 2 from the long-term store 3 to the short-term buffer 4 can take place, for example for orders that have not yet been processed as part of an analysis quantity M or future orders AT (not yet acquired). If the order-processing computer 6 acquires an order AT that exclusively comprises articles 2 that are already preventively stored in the short-term buffer 4, this can also be completed without the aforementioned steps. This means that no analysis quantity M needs to be defined and no separate article groups WG need to be created. Alternatively, orders can include articles 2 that are already preventively in stock in the short-term buffer 4 as well as articles 2 that are not yet in stock in the short-term buffer 4. In this case, the aforementioned steps can be carried out for those articles 2 that are not yet in stock in the short-term buffer 4. For those articles 2 which are already in stock in the short-term buffer 4, the aforementioned steps can, in contrast, be omitted for the completion of the order.

In a further alternative embodiment variant, an article group WG can be extended to include articles 2 that are not contained in the analysis quantity M if a loading aid 9*a* retrieved from the long-term store 3 can thereby be completely emptied during the transfer of the articles 2. In this way, it can be avoided that a possibly small residual quantity of articles 2 is returned to the long-term store 3. Instead, these articles 2 are also transferred to the short-term buffer 4 preventively or proactively in this variant. Orders AT, which exclusively comprise such articles 2 already preventively stored in the short-term buffer 4, can again be completed without the aforementioned steps. Mixed orders can again be handled as described above.

Individual features or feature combinations from the different exemplary embodiments shown and described may represent independent inventive solutions. The object underlying the independent inventive solutions may be gathered from the description.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

1 Storage and picking system
2 Articles
3 Long-term store
4 Short-term buffer
5 Transfer system
6 Order-processing computer
7*a* . . . 7*c* Conveying system
8 Transfer station
9*a* Loading aid (container)
9*b* Loading aid (hanging bag)
10 Picking station
AT Order
AZ Order line
H High priority
L Low priority
M Analysis quantity
N Number of articles
P Priority
WG Article group
WT Article type
ZL Line number

The invention claimed is:

1. A method for transferring articles from a long-term store to an automatically operated short-term buffer and for providing the articles ready-for-dispatch in a storage and picking system which comprises the long-term store, the automatically operated short-term buffer and a transfer system between the long-term store and the short-term buffer, comprising the steps of:

i) providing the articles in the long-term store;

ii) acquiring a plurality of orders, each of the plurality of orders having at least one of a plurality of order lines, wherein each of the plurality of order lines specifies an article type and a number of the articles of the article type comprised by a corresponding one of the plurality of orders, by an order-processing computer;

iii) defining an analysis quantity comprising any number of the plurality of orders by the order-processing computer;

iv) sorting the plurality of order lines of the analysis quantity according to a first sorting criterion in a list by the order-processing computer;

v) selecting a previously unselected one of the plurality of order lines-sorted in the list and, if present, selecting at least one further one of the plurality of order lines of the plurality of orders of the analysis quantity which contains a same said article type as the one of the plurality of selected order lines that has been selected, by the order-processing computer;

vi) combining the plurality of order lines selected in step v) from different ones of the plurality of orders to form one of a plurality of article groups, wherein each of the plurality of article groups comprises only the articles of one article type in each case, by the order-processing computer;

vii) repeating steps v) and vi) until all of the plurality of order lines have been selected and assigned to the one of the plurality of article groups;

viii) retrieving the articles of the plurality of article groups from the long-term store and transferring the articles of the plurality of article groups from the long-term store to the short-term buffer by the transfer system until all the articles of each article type contained in the analysis quantity have been transferred from the long-term store to the short-term buffer;

ix) buffering the articles in the short-term buffer;

x) transporting the articles of the plurality of article groups intended for one order of the plurality of orders to a picking station; and xi) providing the articles intended for the one of the plurality of orders ready-for-dispatch at the picking station.

2. The method according to claim 1, wherein the sorting in step iv) additionally comprises the sorting of the plurality of order lines of the analysis quantity according to a second sorting criterion.

3. The method according to claim 2, wherein the sorting in step iv) additionally comprises the sorting of the plurality of order lines of the plurality of orders of the analysis quantity according to at least one third sorting criterion.

4. The method according to claim 1, wherein the number of the articles comprised by each of the plurality of orders is provided as the first sorting criterion, and the plurality of order lines are sorted in step iv) starting with a largest number of the articles of each of the plurality of orders.

5. The method according to claim 1, wherein a priority of the plurality of orders is provided as the first sorting criterion, and the plurality of order lines are sorted in sequence from high priority to low priority in step iv).

6. The method according to claim 1, wherein the number of the articles of one article type contained in the analysis quantity is provided as the first sorting criterion, and the plurality of order lines are sorted in step iv) starting with a largest number of the articles of one article type.

7. The method according to claim 4, wherein a priority of the plurality of orders is provided as the second sorting criterion.

8. The method according to claim 5, wherein the number of the articles per each of the plurality of orders is provided as the second sorting criterion.

9. The method according to claim 1, wherein the steps v) are carried out in sequence from a first to a last of the plurality of order lines of the list.

10. The method according to claim 1, wherein the order-processing computer in step v) selects a first previously unselected one of the plurality of order lines in the list, and, if present, selects a last previously unselected one of the plurality of order lines of the plurality of orders of the analysis quantity which contains a same said article type as one of the plurality of selected order lines that has previously been selected, and, if present, selects a first previously unselected one of the plurality of order lines of the plurality of orders of the analysis quantity which contains a same said article type as one of the plurality of selected order lines that has previously been selected, and continues with step ii).

11. The method according to claim 1, wherein an article group of the plurality of article groups is extended by a predeterminable number of the articles which are not contained in the analysis quantity.

12. The method according to claim 1, wherein an article group of the plurality of article groups is extended by the articles which are not contained in the analysis quantity when a loading aid retrieved from the long-term store because of this extension is completely emptied during the transfer of the articles and would not completely be emptied during the transfer of the articles without this extension.

13. A storage and picking system, comprising a long-term store for providing the articles;

an automatically operated short-term buffer for buffering the articles;

a transfer system for retrieving the articles from the long-term store and for transferring the articles from the long-term store to the short-term buffer;

a picking station for loading the articles into target containers in accordance with orders and for providing the articles ready-for-dispatch;

an order-processing computer configured for a) acquiring the orders each with at least one of a plurality of order lines, wherein each of the plurality of order lines specifies an article type and a number of the articles of the article type comprised by a corresponding one of the orders;

b) defining an analysis quantity comprising any number of the orders;

c) sorting the plurality of order lines of the analysis quantity according to a first sorting criterion in a list;

d) selecting a previously unselected one of the plurality of order lines sorted in the list and, if present, selecting at least one further one of the plurality of order lines of the orders of the analysis quantity which contains a same said article type as the one of the plurality of order lines that has been selected;

e) combining the plurality of order lines selected in accordance with point d) from different ones of the orders to form article groups, wherein each of the article groups comprises only the articles of one article type in each case; and f) repeating points d) and e) until all of the plurality of order lines have been selected and assigned to the article groups;

wherein the transfer system is configured to carry out the retrieval of the articles from the long-term store and the transfer of the articles from the long-term store to the short-term buffer until all the articles of each article type contained in the analysis quantity have been transferred from the long-term store to the short-term buffer; and wherein the storage and picking system is configured for transporting the articles of the article groups intended for one of the orders to the picking station.

14. The storage and picking system according to claim 13, wherein the long-term store has a plurality of stationary storage racks and at least one automatically operated storage and retrieval device for storing the articles in the plurality of stationary storage racks and/or retrieving the articles from the plurality of stationary storage racks.

15. The storage and picking system according to claim 13, wherein the short-term buffer comprises an overhead conveying system for suspended transport of the articles by transport carriers or hanging bags.

16. The storage and picking system according to claim 13, wherein the transfer system comprises a transfer station, a first conveying system connecting the long-term store and the transfer station, and a second conveying system connecting the transfer station and the short-term buffer.

17. The storage and picking system according to claim 16, wherein the storage and picking system comprises the picking station and a third conveying system connecting the short-term buffer to the picking station, wherein the picking station is configured for loading the articles into target containers in accordance with the orders.

* * * * *